United States Patent
Cosman et al.

(10) Patent No.: US 6,943,803 B1
(45) Date of Patent: Sep. 13, 2005

(54) ANTI-ALIASED, TEXTURED, GEOCENTRIC AND LAYERED FOG GRAPHICS DISPLAY METHOD AND APPARATUS

(75) Inventors: Michael Cosman, South Jordan, UT (US); W. David Fowler, Sandy, UT (US); Eric Despain, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/157,710

(22) Filed: Sep. 21, 1998

(51) Int. Cl.[7] .............................. G09G 5/00; G09G 5/02
(52) U.S. Cl. ...................... 345/581; 345/582; 345/629; 345/589
(58) Field of Search ................................ 345/426, 431, 345/179, 432, 419–425, 427–433, 619, 629, 581, 582, 589; 382/254–256, 225, 154; 342/179, 26; 356/28

(56) References Cited

U.S. PATENT DOCUMENTS

| | | | | |
|---|---|---|---|---|
| 4,671,650 A | * | 6/1987 | Hirzel et al. ................... 356/28 |
| 4,731,859 A | * | 3/1988 | Holter et al. ................ 382/225 |
| 5,043,924 A | * | 8/1991 | Hofmann ..................... 382/154 |
| 5,357,579 A | * | 10/1994 | Buchner ...................... 345/426 |
| 5,412,796 A | | 5/1995 | Olive .......................... 395/500 |
| 5,535,374 A | * | 7/1996 | Olive .............................. 703/6 |
| 5,724,561 A | | 3/1998 | Tarolli et al. ................ 395/523 |
| 5,870,097 A | * | 2/1999 | Snyder et al. ............... 345/426 |
| 5,912,670 A | * | 6/1999 | Lipscomb et al. ........... 345/419 |
| 6,031,541 A | * | 2/2000 | Lipscomb et al. ........... 345/425 |
| 6,052,485 A | * | 4/2000 | Nelson et al. ............... 382/225 |
| 6,064,392 A | * | 5/2000 | Rohner ....................... 345/426 |
| 6,184,891 B1 | * | 2/2001 | Blinn .......................... 345/426 |
| 6,268,861 B1 | * | 7/2001 | Sanz-Pastor et al. ........ 345/426 |

OTHER PUBLICATIONS

"Compositing 3D images with antialiasing and various shading effects", Nakamae, E., IEE computer Graphics and Aplications, vol. 9, No. 2, p. 21–9, Mar. 1989.*

Simulation of Natural Scenes Using Textured Quadric Surfaces, Geoffrey Y. Gardner, Computer Graphics vol. 18, No. 3, Jul. 1984, pp. 11–20.

Visual Simulation of Clouds, Geoffrey Y. Gardner, San Francisco Jul. 22–26, vol. 19, No. 3, 1985, pp. 297–303.

* cited by examiner

*Primary Examiner*—Matthew Luu
*Assistant Examiner*—Chanté Harrison
(74) *Attorney, Agent, or Firm*—Thorpe, North & Western LLP

(57) ABSTRACT

A method and apparatus in a preferred embodiment for generating anti-aliased layered fog which is textured manipulated as if in a geocentric virtual environment to thereby show horizon depression at high altitudes. Hardware is provided such that layer model data and texture model data is combined to generate fogged pixel color.

24 Claims, 10 Drawing Sheets

ANTI-ALIASED, TEXTURED, GEOCENTRIC AND LAYERED FOG GRAPHICS DISPLAY METHOD AND APPARATUS

BACKGROUND

1. The Field of the Invention

This invention relates generally to computer graphics and systems for generating computer graphics on a display device. More specifically, the present invention relates to generating anti-aliased textured and layered fog in a geocentric environment to thereby render a more accurate image of the fog or similar phenomena in conjunction with the earth when viewing an image which is representative of flight at any altitude, but particularly at high altitudes.

2. The State of the Art

The state of the art in rendering fog has been primarily dictated by the restraints of the coordinate system in which terrain environments are rendered. More specifically, the earth is typically rendered in a virtual environment using a flat or Cartesian coordinate system because the curved nature of the earth is typically not noticeable at the scale at which most three dimensional virtual environments are rendered. However, an important exception is the case presented by flight simulation.

The benefits of training pilots by using flight simulators are numerous. However, training is less effective when the pilots are unable to use the same visual clues that are normally present for them in the real world. Accordingly, the desire to provide realistic three dimensional virtual environments has very practical applications, only one of which is described above.

The state of the art in three-dimensional rendering of a virtual flight environment has attempted to realistically render fog, where the term fog includes clouds of varying degrees of opacity. The most common fogging function available today in an image generator (IG) and a graphic accelerator is generally referred to as homogeneous fog. Homogeneous fog derives its name from the fact that fog density is uniform in every direction from an eye position throughout the virtual environment. The density of the fog between an object and the eye position is only a function of the range between them.

FIG. 1 of the prior art shows that layered fog (also called real fog) is a non-homogenous approach to generating the fogging function. The layered fog algorithm provides the ability to define different densities for each layer or altitude in the atmosphere. In this figure, three separate layers 10, 12 and 14 of fog are shown between an eye position 16 and an object 18 being observed. The visibility between the eye position 16 and the object 18 is not only a function of the range between them, but also the layers through which an eye vector (from the eye position 16 to the object 18) passes.

For every pixel that is to be rendered, an eye vector from the eye position 16 to a pixel must be generated. The fog contribution to the pixel must be calculated for each layer through which the eye vector passes on its path to the pixel, and all of these contributions must be blended into a final result.

One important visual clue to a pilot of the present altitude is that the horizon of the earth starts to depress a few degrees at high altitudes, due to the curvature of the earth. As stated previously, the rendering for nearly all IGs and graphic accelerators are in a Cartesian frame of reference, not spherical. To address the need for the correct display of a geocentric environment, polygons that are being processed (scaled, translated and rotated) in a Cartesian frame of reference have their altitudes (usually on the Z axis) depressed as a function of the curvature of the planet and the range from the eye position. This scenario generates believable rendering as long as there is no layered fog applied.

The state of the art in layered fog took advantage of the Cartesian environment by defining the layers along the Z axis of the environment. However, mixing previous layered fog implementations and a geocentric environment are not possible due to the layered fogs' dependency on a "flat earth" or Cartesian frame of reference.

Accordingly, what is needed is a way to provide accurate visual altitude clues in a three dimensional and geocentric virtual environment with layered fog.

In conjunction with a lack of altitude clues, the state of the art also suffers from a lack of velocity clues. State of the art layered fog does little to provide visual cues for horizontal movement of the eye position or other objects in the virtual environment.

Accordingly, what is also needed is a way to provide accurate visual velocity clues in a three dimensional and geocentric virtual environment with layered fog.

Another fundamental problem that has plagued the state of the art layered fog systems is the aliasing that occurs between the pixels of a polygon that straddles the boundary between two or more fog layers which have significantly different fog layer densities. The result is that the center of a pixel will be determined to be within a layer with a high fog density while the center of the adjacent pixel will be determined to be within the next layer with a low fog density. The two resulting pixels will have significantly different pixel colors, and thus aliasing will occur. In other words, a jagged step ladder will be formed along the boundary between different fog layers, instead of a smooth or smudged appearance between them. The problem grows more pronounced as the pixels being rendered are at a great distance from the eye position (such as on the horizon), and when the pixels represent a significantly larger physical area. This occurs when a pixel becomes larger than the thickness of the fog layer.

Accordingly, what is also needed is a way to provide anti-aliasing in a three dimensional and geocentric virtual environment having layered fog.

It is useful to understand the shortcomings of the state of the art by looking at several patents which introduce important concepts, but fail to satisfy the issues above.

In U.S. Pat. No. 5,412,796, the patent issued to Olive teaches the concept of non-homogeneous fog. It is also noted that it is assumed that all fog layers are parallel in a Cartesian coordinate environment, thus failing to provide valuable altitude clues, among other things.

In U.S. Pat. No. 5,724,561, the patent issued to Tarolli et al. apparently teaches the concept of using blending to soften the boundaries between fog layers. Three registers are provided for storing color pixel data, a depth perspective component, and fog color data. This information is then blended using a blending unit and output by the system. This system differs substantially from the method and apparatus of the present invention as will be shown.

OBJECTS AND SUMMARY OF THE INVENTION

It is an object of the present invention to provide a method and apparatus for generating geocentric layered fog in a three-dimensional and geocentric virtual environment to thereby provide visual altitude clues.

It is another object of the present invention to provide a method and apparatus for generating textured layered fog in a three-dimensional virtual environment to thereby provide visual velocity clues.

It is another object of the present invention to provide a method and apparatus for generating anti-aliased layered fog in a three-dimensional virtual environment to thereby provide blended transitions between boundaries of fog layers of different densities.

It is another object to provide a method and apparatus for providing anti-aliased textured and geocentric layered fog in a three-dimensional and geocentric virtual environment to thereby simultaneous provide visual clues for altitude and velocity while rendering blended fog layer boundaries.

It is another object to provide apparatus for generating the anti-aliased textured and geocentric layered fog which includes computing layer model data and texture model data.

The present invention is a method and apparatus in a preferred embodiment for generating anti-aliased layered fog which is textured and manipulated as if in a geocentric virtual environment to thereby show horizon depression at high altitudes. Hardware is provided such that layer model data and texture model data is combined to generate fogged pixel color.

In a first aspect of the invention, anti-aliasing is accomplished by generating a plurality of sample points for each pixel, where the sample points are separated by approximately one screen pixel. The densities of each of the sample points are then blended to form an anti-aliased pixel density value for a rendered pixel. Some of the novel aspects include the process of anti-aliasing the layered fog the process of obtaining the variables for the delta sample altitude, and the process of blending the sample densities together to form the final anti-aliased layered fog density value.

In another aspect of the invention, providing texture to the layered fog is accomplished by tracing an eye vector through all the fog layers, and then blending the effect of each of the layers into a final blend of the fog and pixel color. At each texture layer, the X and Y components of the eye vector are used as indices into a texture map. The blending of color and density modulation, and local and global texture effects are used to generate the appearance of a fog layer with finite thickness, not just a texture plane.

In another aspect of the invention, geocentric fog algorithms are utilized to modify the functioning of a primarily Cartesian layered fog algorithm. Without this function, noticeable visual anomalies appear.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
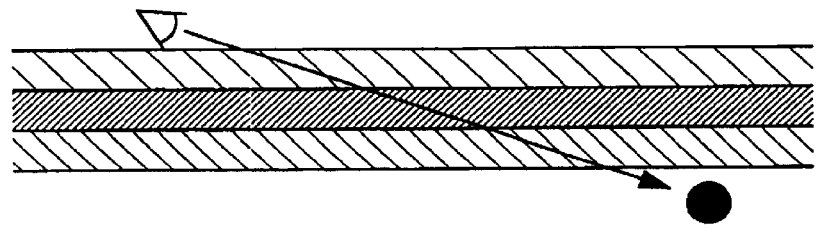
FIG. 1 is an elevational profile view of an eye, three distinct layers of fog having different densities, and an object being viewed by the eye through all of the fog layers.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Before describing the presently preferred embodiment of the present invention, it is useful to briefly examine several limitations of state of the art layered fog systems that have become apparent during their use.

First, there is a problem associated with large variations of the density of adjacent fog layers. Aliasing can occur when a single pixel width exists between two relatively different fog densities. The result is a jagged and harsh step-like structure of the rendered image because the two resulting pixels will have significantly different pixel colors.

The next problem is that while there is a variation of fog density with altitude (vertical variation), there is no variation within the plane (horizontal variation) of the fog layers. Thus, if the eye position moves in parallel with the plane of the layered fog there is no visual cue for the speed or direction of motion in relationship to the fog layers.

Currently, many IG's simulate the appearance of patchy clouds and fog using a semi-transparent polygon. However, this effect only works well when the eye position is a great distance from the polygon. As the eye position nears the polygon, it become obvious that the cloud is being modeled by a polygon that has no depth.

Third, an important visual cue to a pilot of his altitude is that the horizon of the earth starts to depress a few degrees at high altitudes, which is due to the curvature of the earth. The rendering for nearly all IG's and graphic accelerators are in a Cartesian frame of reference (not spherical or geocentric). To address the desire for the correct display of a geocentric environment, polygons that are being processed (scaled, translated, and rotated) in a Cartesian frame of reference have their altitudes (usually on the Z axis) depressed as a function of the curvature of the planet and the range from the eye position. This creates believable rendering as long as there is no layered fog applied. Previous implementations of layered fog took advantage of the Cartesian environment by defining the layers along the Z axis of the environment. However, mixing a state of the art layered fog implementation and a geocentric environment are not possible due to the layered fogs dependency on a "flat earth" or Cartesian frame of reference.

The presently preferred embodiment describes a new way to solve the problem of aliasing associated with layered fog. Aliasing artifacts will be reduced by generating three layer model samples and blending the samples density values together. The samples will be located over an altitude range that corresponds to approximately one pixel height in screen space.

Figure 2:
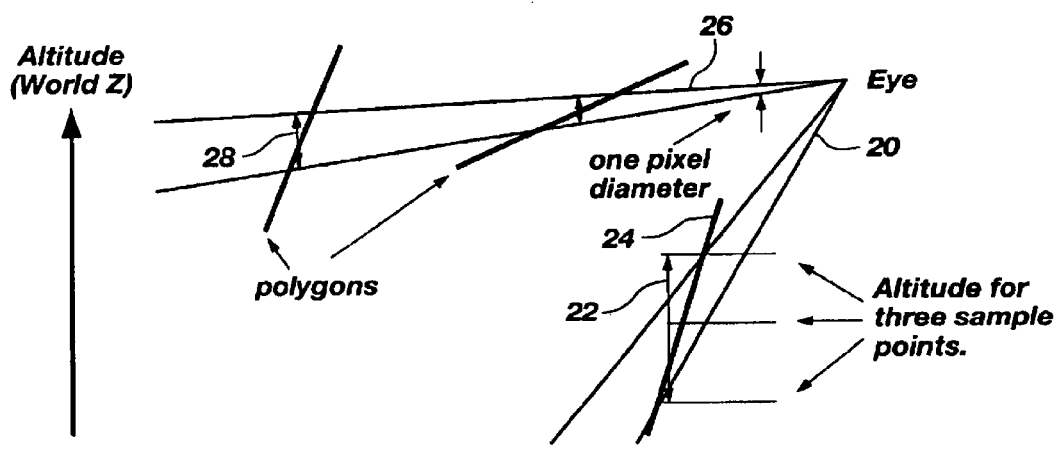
FIG. 2 is a graphical illustration of how a delta altitude between the sample points varies as a function of polygon orientation, the eye vector orientation, and the range from the eye to the pixel.

FIG. 2 is used to illustrate where these sample points should be and how a delta altitude between the sample points varies as a function of polygon orientation, the eye vector orientation, and the range from the eye to the pixel.

FIG. 2 shows that when the eye vector 20 has a primarily vertical direction, the sample altitude 22 is primarily determined by the orientation of the polygon 24. However, as the eye vector 26 approaches a horizontal direction, the sample altitude 28 is primarily determined by the range, and not polygon orientation.

The sample altitude 22, 28 is calculated using the pixel to eye vector (E), the polygon plane normal vector (P), the eye to pixel range (R), and the pixel size in radians (view frustum angle divided by the number of vertical display pixels).

The first step in determining the sample altitude is to calculate a unit vector that lies in the plane of the polygon and points in the direction most aligned with eye vector, or the eye footprint vector on the plane of the polygon. The footprint vector (F) can be calculated by first taking the cross-product of the eye and polygon normal vector (E×P), which is perpendicular to both the eye and polygon normal vector. A cross-product is then taken of this new vector and the polygon normal vector to produce F=(P×(P×E)). This vector is the unnormalized vector aligned with the direction of the eye vector in plane of the polygon, or the footprint vector.

Figure 3:
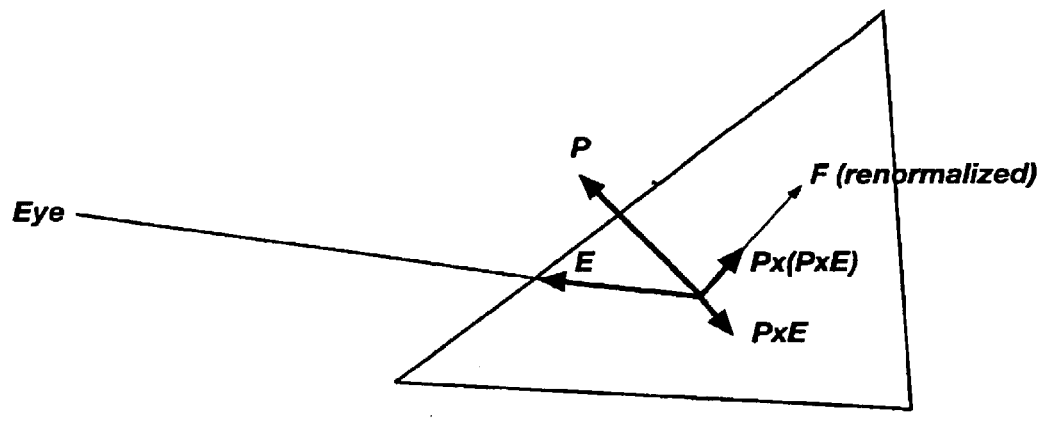
FIG. 3 is a graph of the footprint vector that is an unnormalized vector aligned with the direction of the eye vector in the plane of the polygon.

As shown in FIG. 3, renormalizing the footprint vector results in a vector that has a unit length of one in the plane of the polygon. The normalized footprint vector is scaled by a slant factor to account for the orientation of the plane of the polygon to the eye vector (stretch the vector).

Figure 4:
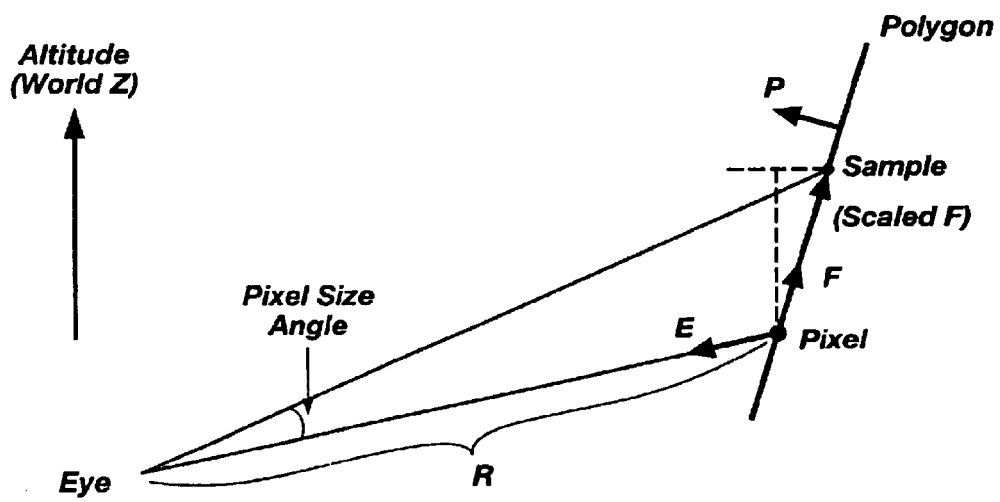
FIG. 4 is a graphical illustration of the footprint vector after being scaled.

FIG. 4 shows that the slant factor is based on the assumption that the pixel size angle is very small, less than one degree, and that the range between the pixel and the eye position will always be significantly larger than the pixel to sample distance. These assumptions also imply that the pixel to eye vector and the sample to eye vector can be assumed to be essentially parallel.

Figure 5:
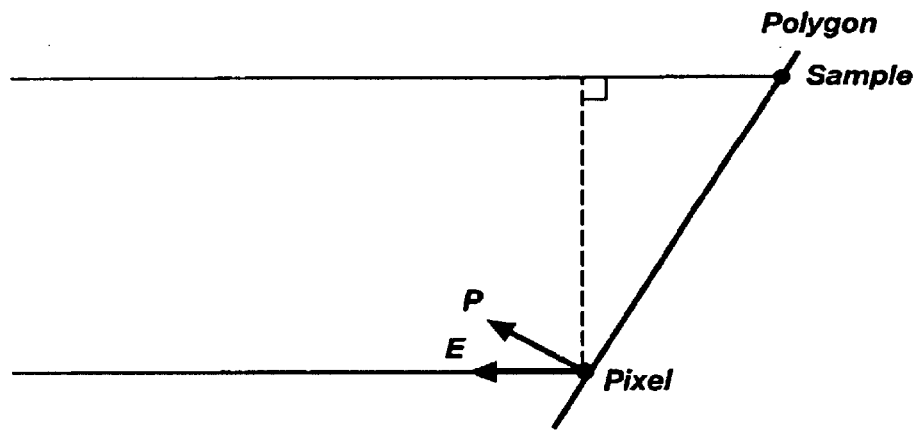
FIG. 5 is a graphical illustration of how to find the distance from the pixel to the sample using a right triangle.

FIG. 5 shows how the previous assumptions are used as the means to find the distance from the pixel to the sample using a right triangle. The hypotenuse distance can be found using the following equation:

$$\text{Hypotenuse} = \frac{\text{adjacent}}{\cos\phi} \quad \text{Equation 1}$$

The acute angle of the right triangle is equal to the angle between the polygon normal and eye vector, thus:

$$\text{Hypotenuse} = \frac{\text{adjacent}}{(P \cdot E)} \quad \text{Equation 2}$$

Thus, the scaling factor is the inverse function of the dot product of the plane vector and the eye vector. The scaled footprint vector is calculated as follows:

$$ScaledF = \left(\left(\frac{F}{(P \cdot E)}\right) \cdot R \cdot \sin\theta\right) \quad \text{Equation 3}$$

The pixel size ($\theta$) will always be very small (less than 1 degree). The sine of a very small angle results in a value that is nearly the same as the value of the angle measured in radians. In fact, for the precision that is required for the layered fog effect, the sine function can be dispensed with altogether and the radian value of the angle will be used in its place. Thus equation 3 reduces to the following:

$$ScaledF = \left(\left(\frac{F}{(P \cdot E)}\right) \cdot R \cdot \theta\right) \quad \text{Equation 4}$$

The Z component of the scaled foot print vector is the altitude difference between the pixel and the sample positions. In essence, equation 4 provides a complete solution; however, all that is actually needed for anti-aliasing is the Z component of the scaled footprint vector. Therefore, the process begins with equation 5 as follows:

$$F_{(unnormalized)} = P \times (P \times E) \quad \text{Equation 5A}$$

where $$P \times (P \times E) = (P_y(P_x E_y - P_y E_x) - P_z(P_z E_x - P_x E_z)),$$

$$(P_z(P_y E_z - P_z E_y) - P_x(P_x E_y - P_y E_x)),$$

$$(P_x(P_z E_x - P_x E_z) - P_y(P_y E_z - P_z E_y)) \quad \text{Equation 5B}$$

Because only the Z term is required, the equation is reduced to the following:

$$F_{z(unnormalized)} = P_z(P \cdot E) - E_z \quad \text{Equation 6}$$

Applying the normalizing factor to the footprint vector produces a normalized Z component:

$$F_{z(normalized)} = \frac{(P_z(P \cdot E) - E_z)}{\sqrt{(1 - (P \cdot E)^2)}} \quad \text{Equation 7}$$

The scaled F in the z dimension or the sample Z distance is calculated by applying the slant factor, range, and the pixel size, which is simply the footprint vector in the Z direction:

$$Sample_z = \left[ \frac{(P_z(P \bullet E) - E_z)}{(P \bullet E)\sqrt{(1 - (P \bullet E)^2)}} \right] \cdot R \cdot \theta \quad \text{Equation 8}$$

Unfortunately, Equation 8 still has a significant amount of complex math. Therefore, to reduce the complexity of the design of the system, the dot product of the plane and the eye vectors will be used to index into a precalculated look-up table to determine the value of the modulating value M as shown in Equation 9:

$$M = \frac{1.0}{(P \bullet E)\sqrt{(1 - (P \bullet E)^2)}} \quad \text{Equation 9}$$

This will reduce the sample Z calculation to a table look-up, a dot product, four multiplies, and one subtraction as shown in Equation 10:

$$Sample_z[M(P_z(P \bullet E) - E_z)] \cdot R \cdot \theta \quad \text{Equation 10}$$

Unfortunately, Equation 10 fails at two points: when the eye point is looking straight-on to the polygon, and when the eye point is looking edge-on. Because we have reduced M to a look-up table, it is possible to deal effectively with the corner cases by manipulating the contents of the look-up table that are produced at the corner conditions.

For the straight-on case, the length of P×E goes to zero, while the modulating factor goes to infinity. The table limits the modulating factor to a large but finite value; however, as the eye and plane normal approach a horizontal value (z component goes to zero) the sample Z value will approach zero. In this case we know that the delta Z value of the unit footprint vector is simply the length of the plane-normals projection into the XY plane, or the square root of the sum of the plane X and Y components squared (this represents the lower limit for Z). This value is called the polygon width factor. The sample Z value will be restricted to a value greater than or equal to the polygon width factor.

A similar problem occurs when the polygon is viewed edge-on. Here the sample Z value approaches infinity. The sample Z value is limited to some large but finite number and this value is clamped to within the minimum and maximum Z values of the polygon.

Another special case situation occurs at the horizon. As the eye vector approaches the horizon the sample Z value needs to approach one, so that we are always taking our three antialiasing samples over a span of one pixel. As the Z-component of the eye vector approaches zero, the sample Z value is progressively forced towards one.

The actual altitudes for the three layered-fog anti-aliasing samples are the initial pixel altitude, sample altitude plus the sample Z, and the sample altitude minus sample Z. These Z values are then bounded by the minimum and maximum altitudes of the polygon in world space coordinates.

For all three altitude samples, a density value is generated from the layered fog density profile. These three density samples are blended into a single layered fog density, however, because their visual effects are a result of the final exponentiations, and it is their visual effects that need to be averaged together. In general, the three densities will be about the same; however, where they differ substantially a simple average will cause the largest value to dominate and eliminate the anti-aliasing benefit of the other two. The visual effect of averaging after exponentiating can be achieved with the following strategy: the aggregate density is determined to be the smallest value, plus limited deltas between the smallest and the other two values. Specifically, if Ds, Dm, and Dl represent the smallest, middle, and largest density values, then:

$$D_{average} = D_s + \frac{[\min(0.5, D_m - D_s) + \min(0.5, D_l - D_s)]}{4} \quad \text{Equation 11}$$

This function results in a density value that is within about six percent of the averaged exponentiated results.

Along with the anti-aliasing process described above, the present invention also describes a new and important means of providing position and velocity cues, and adds an important effect of realism to the layered fog, which is well behaved if the eye position is near, far, or inside of a cloud layer.

The texture cloud model consists of multiple textured regions. Each region has top and bottom altitudes and visual attributes. In order to model the fog layers properly, a modified fog color, density delta, layer colors, and opacity modulation are calculated for each pixel. The density delta is added to the antialiased density of each pixel. Both positive and negative values of the density delta are possible, allowing for opacity modulation within a layer to create the effects of a thin or intermittent cloud cover.

Figure 6:
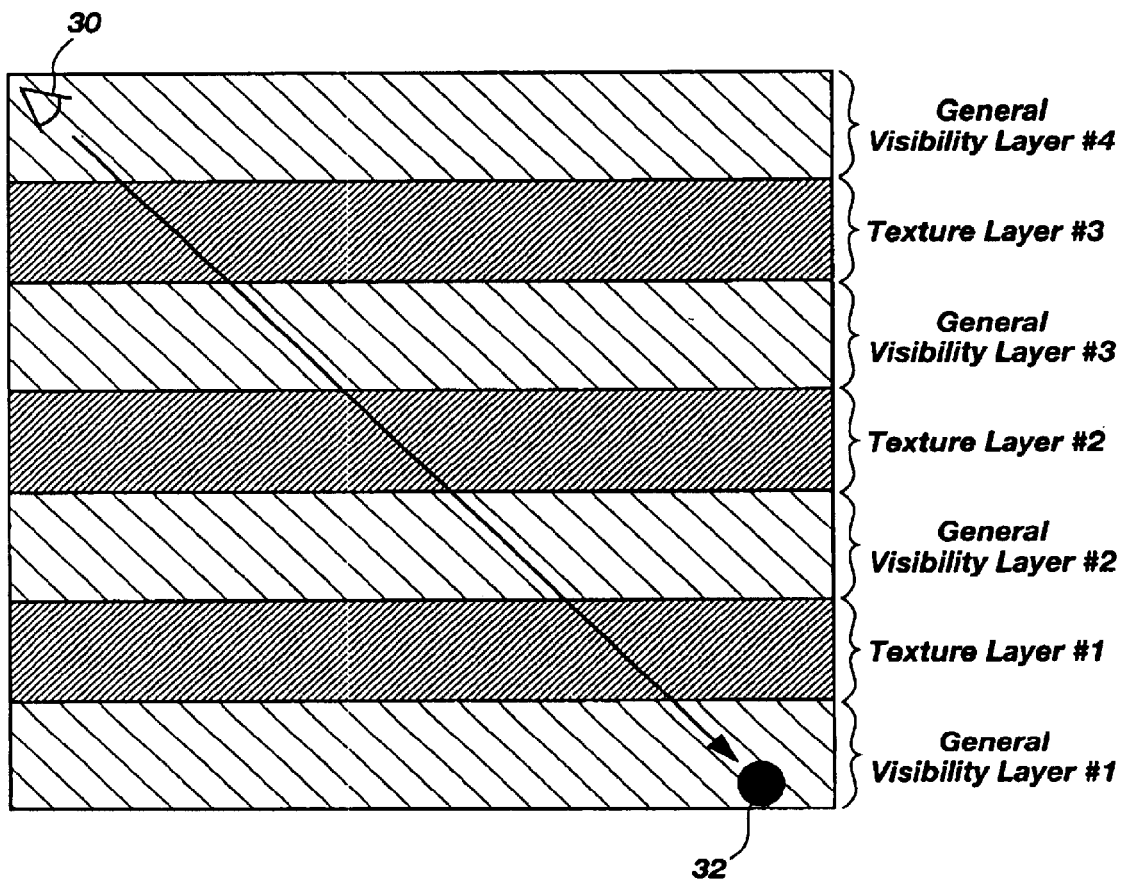
FIG. 6 is a graphical illustration of textured regions and intervening untextured general visibility regions that are processed such that the effect of each layer is computed individually, and then attenuated by any intervening layers.

FIG. 6 provides an example of what is going to be described hereinafter. To assure an aesthetically pleasing and technically acceptable fog effect, the behavior of each fog layer is consistent and independent of the behavior of the other layers. Thus, textured regions and intervening untextured general visibility regions are processed such that the effect of each layer is computed individually, and then attenuated by any intervening layers.

The general visibility regions use the top and bottom colors of the adjacent textured regions for the general visibility region top and bottom colors. For example, the bottom color of a general visibility region is the top color of the textured region directly below it. Color is linearly blended between the top and bottom colors of the general visibility region.

The calculation of the density from the eye point 30 to the pixel 32 requires the combining of the effects on density and color from each layer. For each layer, the portion of the eye vector that lies within that layer is calculated and the density is determined based on the length of the eye vector. If the eye vector completely traverses a region from top to bottom, the density integral for the layer is the density sum of the top of the layer subtracted by the density sum of the bottom of the layer multiplied by the ratio of the viewray over the embedded distance.

What is important to realize is that there are several situations which the invention must properly account for visually. For example, the eye position and the pixel might be completed outside of and on the same side of a cloud layer. Other situations include (1) where the pixel is on the inside of a cloud layer, (2) where the eye position and the pixel are both within the cloud layer, (3) where the eye position is within the cloud layer and the pixel is outside the cloud layer, (4) where the eye position is outside and on a first side of the cloud layer, and the pixel is on the outside and an opposite side of the cloud layer.

The density for a texture layer is modulated by the texture. The texture is scaled by the opacity gain. This value is added to the layer density since the final effects are due to a subsequent exponentiation. The signed addition can have the effect of cutting the layer density to zero, or it may increase the density, making it the fog even more dense.

The results from each layer are summed into a net density delta, which is added to the average density computed in the anti-aliased density. Also, the densities computed during the processing of the view ray are summed. A blending factor α is computed by exponentiation. Similarly, a net fog color is computed from all the layers as shown in equation 12.

$$\overline{C}_{TC} = (\overline{C}_{(TC-1)} \cdot \alpha) + ((1-\alpha)\overline{C}_{TF})$$ Equation 12

The $\overline{C}_{(TC-1)}$ color is the fogged color calculated for the previous level and the $\overline{C}_{TF}$ color is the fog color for the current layer. Using the transmittance value, the transmitted color for the layer is the $\overline{C}_{TC}$ color. The fogged color after the evaluation of the last layer is the texture model color, and the density sum of all the layers is used to generate a texture model transmittance value:

$$T_{TM} = e^{-AD}$$ Equation 13

Texture lookup involves computing where the eye vector intercepts the texture layer. The texture U and V axes are aligned with the database X and Y axes. The U and V texture coordinates are computed from the eye position to texture layer range (Ret), the eye position (EPos), and the normalized eye vector (V) X & Y components:

$$U = \frac{(EP_{OSx} + (R_{et} \cdot E_x))}{T_{size}}$$ Equation 14

$$V = \frac{(EP_{OSy} + (R_{et} \cdot E_y))}{T_{size}}$$ Equation 15

The Tsize is the texture cell (texel, or one pixel worth of texture) size in the data base units. The range to the texture layer is computed by scaling the eye to pixel range by the ratio of the eye to texture layer height (Het) and the eye to pixel height(Hep).

$$R_{et} = R_{es}\left(\frac{H_{et}}{H_{ep}}\right)$$ Equation 16

Having described anti-aliasing and texturing of the different fog layers, the issue of fog layers in geocentric environments will now be addressed. The present invention is a system that provides a multilayer fog visual effect by solving an analytical atmospheric model at speed as each scene pixel is rendered, rather than by rendering a transparent polygonal cloud model and then viewing scene details through it. The system provides greatly improved fog effects without any pixel fill-rate penalty, and without the limitations and image quality problems associated with using transparent polygons.

In general, it is noted that most prior layered fog systems do not use any polygons to create the fogging effects; rather, the visual effects of fogging are applied to the contents of a virtual environment (sky, terrain, vehicles, etc.) Fogging is a modification of existing polygons and their pixels, and to correctly render a geocentric environment requires changes in how all polygons and their pixels are processed.

The layered fog model is constrained to a Cartesian frame of reference. Depressing of polygons for rendering in a geocentric environment and then uniformly using these depressed altitudes for fogging would create noticeable visual anomalies.

Figure 7:
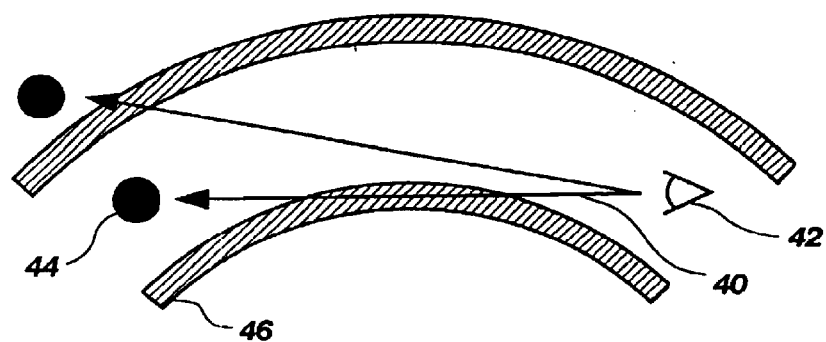
FIG. 7 illustrates one of the potential problems that can be correctly handled by geocentric fog layers, but not fog layers in a Cartesian coordinate environment.

FIG. 7 illustrates one of the potential problems that can be correctly handled by geocentric fog layers, but not fog layers in a Cartesian coordinate environment. As shown, a vector 40 between the eye position 42 and a first object 44 can pass in and out of a fog layer 46. The present invention teaches a method for modifying the functionality of a primarily Cartesian layered fog algorithm.

When applying texture to a fog or cloud layer, a texture motif can be used to modify both the brightness and visual density of the layer. The texture is associated with one of two horizontal planes that are located somewhat inside the layer. If the eye is above the upper texture plane, the upper plane is used; if the eye is below the lower texture plane, the lower plane is used. The user sets these two texture plane altitudes as part of the atmosphere model, and the hardware decides which plane to use based on the altitude of the eyepoint. As the eye moves from outside the layer towards one of these texture planes, the texture effect associated with the plane is attenuated so that when the eye is at the same altitude as the texture plane, no texture motif is visible. At the same time, a "local" texture effect ramps up from nothing to full. This local effect is simply the value of the texture at the lateral (x and y) position of the eyepoint, used as the instantaneous layer fog color and density delta, and applied to the entire scene. The visual effect when flying entirely inside a cloud layer is a modulation of color and visual density that correlates with eyepoint position and velocity, and resembles "scudding". Scudding is a term that refers to the act of flying through clouds where the view of the pilot is intermittently whited out when passing through a cloud. This process provides the visual effect of a textured layer without the strong impression that the texture is all on a single flat plane, and it allows the eyepoint to fly through a cloud layer without the sudden and distracting penetration of the texture plane. In other words, if the texture is only applied to the surface of the cloud, then the texture will be absent when flying through the cloud.

Figure 8:
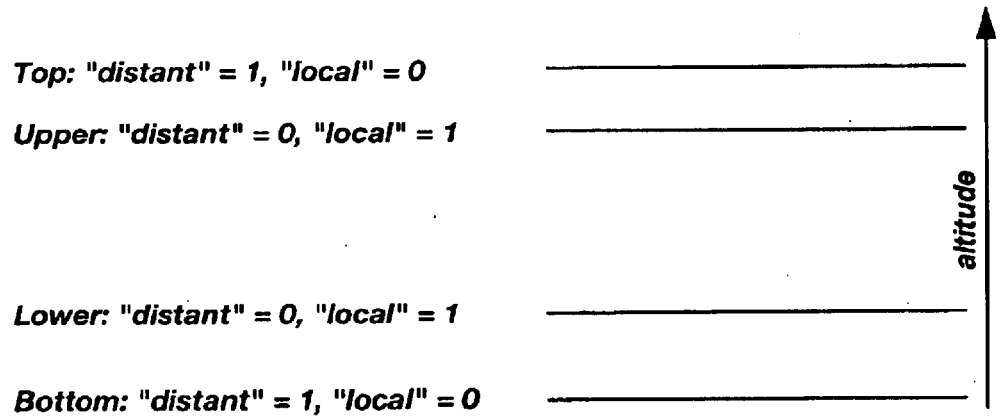
FIG. 8 is a graphical illustration of a layer model that consists of altitudes for the bottom, lower, upper, and top boundaries of a cloud of fog layer.

FIG. 8 helps illustrate this process. The layer model consists of altitudes for the bottom, lower, upper, and top boundaries. If the eye is above the upper altitude, the texture layer is scanned on the horizontal plane at "upper". If the eye is below the lower altitude, the texture layer is scanned on the horizontal plane at "lower". The blend between local and distant effects occurs between "top" and "upper", or between "lower" and "bottom". When the eye is between "upper" and "lower", the distant effect is nulled out, and the entire texture effect is a full-screen scudding effect. If the eye is above "top" or below "bottom", the entire effect is the "distant" effect, and scudding is nulled out. The blend between "distant" and "local" is linear based on eye altitude when the eye is in either blend region. No texture is applied if the viewray from the eye doesn't intersect the texture plane. In other words, no texture is applied if the viewray is not directed towards a textured layer, or if the viewray intersects the pixel before it reaches the viewray.

Accordingly, one novel aspect about the process described above is that the present invention uses an altitude based blend region to transition from a distant to a local texture effect as the eye approaches a cloud layer texture plane, to mask the penetration of the texture plane. The local texture effect provides a realistic, spatially and temporally correlated scud effect.

It is important to consider the visual attributes of a cloud. The texture layer visual attributes include color, texel size, texel stretch, texel level-of-detail (LOD) control, brightness modulation amplitude, visual density modulation amplitude, and an illumination direction flag.

Still referring to FIG. 8, the top and bottom of the texture layer can have independent colors. The color used for the layer is either the top color, if the eye is above "top", or the bottom color, if the eye is below "bottom", or a linear blend between them if the eye is inside the layer, based on the eye altitude. The top and bottom of the texture layer can have independent intensity modulation gain factors. The intensity modulation gain used for the layer is either the top gain, if the eye is above "top", or the bottom gain, if the eye is below "bottom", or a linear blend between them if the eye is inside the layer, based on the eye altitude. The intensity modulation gain is applied to the texture values to scale them. A value of 0 suppresses the modulation and causes the layer color to be uniform at the computed constant color, and a value of 1 provides maximum texture modulation. The texture values are multiplied by the modulation gain, then offset and scaled so that maximum modulation provides color scale factors between approximately 0.125 and 1.875. This factor is then applied to the layer color, overflows are saturated, and the result used as the final layer color at this pixel.

The texture layer has a visual density modulation gain factor. This factor controls how the texture modifies the visual "thickness" of the fog in the layer.

A value of 0 creates a homogeneous layer with no "scud" effect, and the maximum value provides a fairly strong scud effect, plus it allows the texture to cut wispy or feathered "holes" in the layer. The way in which layer visual density is modified must be carefully controlled to avoid unrealistic or bizarre effects. The texture result is scaled to provide a visual density delta value which ranges from approximately −1.75 to +1.75, and further attenuated for viewrays near the horizon by both a modulation clamp and an opacity clamp. This value is further attenuated by the existing layer visual density if it is less than 1. This ensures that the visual density modulation effect is well bounded by the actual visual density of the layer. The final signed density delta will be applied to the overall viewray density to determine actual visibility along the entire view ray. This process allows the construction of cloud layers with wispy holes, and prevents the visual effects of one layer from interacting improperly with those of another layer. Accordingly, it is possible to look through several different cloud layers and see the ground intermittently when holes in the layers line up.

Therefore, one of the novel aspects of the present invention in this regard is that the system uses texture to modify the visual density of a cloud layer, where the density variation is constrained by the available layer density to prevent visual anomalies.

When creating the appearance of three dimensional clouds, it is important to note the following. First, the texture layer has texel size and stretch parameters, and a level-of-detail transition parameter. The size parameter establishes the basic "granularity" of the cloud motif at its highest or most detailed representation. The stretch value allows the texture motif to be stretched in either the texture U or V direction, to provide additional cloud motifs. The level-of-detail parameter controls how big texels appear on screen; i.e. how "busy" the cloud layer looks. LOD transitions are programmed around keeping this constant level of busyness.

Second, the texture layer has a parameter that says whether the illumination is coming from above or below the layer. Usually, clouds are illuminated from above, but occasionally an overcast is illuminated from below during sunrise or sunset conditions. The visual effect of cloud illumination is to make some portions of the cloud brighter, and some darker. If the illumination is from above the layer, and the eye is also above the layer, then higher parts of the irregular layer top will appear bright, and lower parts or "valleys" will appear darker. Conversely, if the illumination is from above the layer but the eye is below the layer, then the lowest portions of the layer will appear dark, and the (inverted) valleys will appear brighter.

We simulate this effect with a two-stage texture look-up strategy. The first look up computes the intercept of the view ray and the texture layer, and uses the texture result for the visual density modulation value. This value is also scaled and used to lengthen or shorten the view ray by up to about a texel, at the current texture LOD. The modified view ray is then used in a second texture look-up to get the brightness modulation value. The same texture map is used for both lookups, so high texel values in the map correspond to both brighter cloud color and denser cloud regions, etc. The lengthened or shortened view ray is scaled by the x and y parts of the eye-to-pixel unit normal, so the brightness motif gets shifted out or in slightly, independently of which direction you are looking. The illumination direction flag determines whether positive map values result in positive or negative motif shifts. The shifting of bright and dark portions of the motif relative to each other creates the impression that the surface of the cloud layer is not flat, but three-dimensional, with a roughness that approximates the size of the cloud puffs.

Note that the sense of the shift also needs to be reversed depending on whether the eye is above or below the layer. A layer that is illuminated from above will have its motif shifted one way when the eye is above the layer, and reversed when the eye goes below the layer.

Accordingly, one of the novel aspects of the present invention is that the 3D appearance of a cloud texture is enhanced by shifting the light and dark portions of the texture motif based on a prior lookup of that same motif, combined with a way to reverse the sense of the shift based on the direction of illumination reaching a cloud layer, and whether the eye is above or below the layer.

The present invention also provides a method and apparatus for concatenating atmospheric cloud layers. Specifically, this aspect of the invention relates to the computation of proper visual attributes for a multi-layer atmospheric model given the position of the observer (eye point) and a scene element (polygon). It includes a mechanism for applying a cloud horizon effect that accounts for earth curvature.

A fog or cloud layer is a vertical region of the atmosphere defined by bottom and top altitudes, a color, and an opacity. Note that the opacity is the exponential of the visual density discussed above. Thus opacity is a value that ranges from 0 (clear; no fog) to 1 (totally dense; can't see anything.) The atmospheric model consists of some number of non-overlapping layers. A view ray between the eye point and a polygon passes through any intervening layers. The color and opacity characteristics of a layer are computed for the portion of the layer that the view ray passes through; the method of computation is not relevant for this invention.

A layer between the eye and the polygon attenuates the polygon color, and adds some of the layer color. The layer opacity value (Op) is a number between 0 (totally transparent) and 1 (totally opaque). The corresponding visual transmittence value (Vt) is simply (1-Op). Color values (r/g/b) passing through the layer are multiplied by the layer transmittence to attenuate them. The color contributed by the layer is the product of the layer color and opacity. The sum of these defines the new r/g/b value that is input to further layers along the view ray:

$$r/g/b_{out} = r/g/b_{in} * Vt_{cloud} + r/g/b_{cloud} * OP_{cloud} \quad \text{Equation 17}$$

The proper computation of the overall effect requires the layers to be applied to the view ray in the proper sequence-beginning at the polygon, and moving to the eye point. The initial r/g/b is the polygon color, and the terminal r/g/b is the composite color after applying atmospheric effects.

As stated previously, the present invention utilizes a combination of texture and general visibility layers. Typically, the atmosphere is divided into two kinds of layers. Dense, more opaque layers form a visual substrate that can be textured, and which can function as a cloud horizon when a curved earth approach is used. These "cloudy" layers are interspersed with "clear" layers, corresponding to the relatively good visibility of the atmosphere between an overcast and a cloud deck. Only the dense, texturable layers are capable of functioning as an occulting cloud horizon (discussed elsewhere in this document.) Recall that layer texture transitions from a distant effect (a cloud pattern on the layer) to a local effect (an instantaneous local color) as the eye moves into a textured layer. While the horizon color is constant, it doesn't always agree with the local effect, so some special processing of the horizon is required.

Recall that (for curved earth) scene details beyond the cloud horizon range, above the dense layer that establishes the horizon, but below the slope from the eye to the horizon, are given special treatment. If the view-ray is below the horizon slope but within a pixel of it, the color at that point along the view ray is a blend of the existing color and the horizon layer color. If the view ray is more than a pixel below the horizon slope, the altitude of the scene element at that pixel is depressed enough to fully immerse the scene element in the horizon layer. When the view ray is within a pixel of the horizon, and the special horizon antialias blend is active, the resulting blended color must then be modified by the local layer color if the eye is in the horizon layer. The special horizon color blend must be inserted into the layer concatenation sequence ahead of the horizon layer, if the horizon layer contains the eye.

The concatenation sequence mentioned above includes the following steps. First, the individual layer colors and opacities are computed in dedicated parallel hardware. The layer concatenator must determine what order to apply these effects, and which layer contributions to ignore (because the view ray doesn't touch them). It does this by multiplexing (selecting) the layer data to load it into each stage of the concatenation pipeline, and by setting the opacities to zero for layers that aren't needed. Note that the concatenation pipeline contains a stage for each layer, whether it's a texture layer or an intervening "general visibility" or "genvis" layer. It also contains an extra concatenate stage for horizon blend, the "B" layer. Each of these hardware stages is identical so it can deal with any of these three types of concatenates.

FIG. 6 is again referred to in order to illustrate this concept. Assume the particular implementation provides an atmosphere divided into seven layers. Three of these are texture layers, and interspersed with (and above and below) are four other genvis layers. These layers are numbered 0 through 6, beginning with the lowest. Thus layers 0, 2, 4 and 6 are genvis layers, and layers 1, 3 and 5 are texture layers. The eye can be in any one of these layers, and it can be looking "up" (polygon view ray intercept is higher than the eye altitude) or "down" (polygon view ray intercept is lower than the eye altitude). Note that we are dealing with altitudes in the flat-earth layer coordinate system. Further note that the horizon layer can only be a texture layer, and doesn't exist if the eye is below the lowest texture layer. From the discussion of curved earth processing, remember that we switch between bounding deck and ceiling layers while we are inside a texture layer, so the switch is hidden by the thick cloud around us. Thus the horizon layer is not strictly slaved to the eye layer. Let E be the index of the layer the eye is in (0->6 inclusive), and H be the index of the horizon layer (0->3 inclusive, where 0=no horizon, 1=1, 2=3, 3=5, i.e. the three texture layers.) The value of H switches somewhere inside each texture layer; the exact place doesn't matter here. The parameters that determine the concatenation order are thus up/down (0/1; 0=looking down), H, and E. There are twenty different concatenation orders:

| u/d | H | E | order |
| --- | --- | --- | --- |
| 0 | 0 | 0 | 0, —, —, —, —, —, —, — |
| 0 | 0 | 1 | 0, 1, —, —, —, —, —, — |
| 0 | 1 | 1 | 0, B, 1, —, —, —, —, — |
| 0 | 1 | 2 | 0, 1, B, 2, —, —, —, — |
| 0 | 1 | 3 | 0, 1, B, 2, 3, —, —, — |
| 0 | 2 | 3 | 0, 1, 2, B, 4, 3, —, — |
| 0 | 2 | 4 | 0, 1, 2, 3, B, 4, —, — |
| 0 | 2 | 5 | 0, 1, 2, 3, B, 4, 5, — |
| 0 | 3 | 5 | 0, 1, 2, 3, 4, B, 5, — |
| 0 | 3 | 6 | 0, 1, 2, 3, 4, 5, B, 6 |
| 1 | 0 | 0 | 6, 5, 4, 3, 2, 1, 0, — |
| 1 | 0 | 1 | 6, 5, 4, 3, 2, 1, —, — |
| 1 | 1 | 1 | 6, 5, 4, 3, B, 2, 1, — |
| 1 | 1 | 2 | 6, 5, 4, 3, B, 2, —, — |
| 1 | 1 | 3 | 6, 5, 4, B, 3, —, —, — |
| 1 | 2 | 3 | 6, 5, B, 4, 3, —, —, — |
| 1 | 2 | 4 | 6, 5, B, 4, —, —, —, — |
| 1 | 2 | 5 | 6, B, 5, —, —, —, —, — |
| 1 | 3 | 5 | B, 6, 5, —, —, —, —, — |
| 1 | 3 | 6 | B, 6, —, —, —, —, —, — |

The (-) means that the opacity for that stage of the concatenator is set to zero, so that it just passes the input to the output (doesn't matter what the stage colors are . . . ). Note that since all concatenators are active all the time (the nature of pipelined hardware . . . ), we can simplify some of the multiplexing by spreading the active layers over the 8 concatenators differently; many such optimizations are possible.

Accordingly, another one of the novel aspects of the present invention is that cloud layer effects are concatenated in an order determined by the relative altitudes of the eye (E) and view ray intercept, that includes an additional concatenation stage to apply a horizon blend. The concatenation is based on combining incoming and stage color based on stage opacity.

Another aspect of the invention involves earth-curvature depression of displayed geometry. Specifically, image generators process geometry in a three-dimensional Cartesian coordinate system; typically the x direction is east, the y direction is north, and the z direction is "up". The visual effect of a curved or spherical planet can be simulated by depressing, or lowering, the height or z coordinate of scene vertices as a function of their distance from the observer. For distances that are a small fraction of the planet radius, this depression value can be approximated as a function of the square of the distance: $d = k*r^2$, where $k = 0.5/Rp$, and Rp is the radius of the planet. For the earth, with coordinates expressed in feet, k is approximately $2.4*10^{-8}$. If scene features are on or near the surface of the earth, it makes little difference whether the distance used is the horizontal range, or the true slant (3D) range.

As an example, a mountain peak 180 nautical miles (nm) away will be depressed about 29,000 feet; it would be completely hidden below the horizon for an observer on the ground. The peak is depressed about 1.5 degrees of angle, or roughly the width of your thumb seen at arm's length. Expressed another way, for a typical out-the-window display channel configuration, the mountain peak is depressed about 20 video scan lines. These visual effects are very noticeable to pilots; they are also essential to the proper simulation of ocean-going vessels.

A related effect, of particular interest to pilots, is that the position of the horizon itself sinks below the horizontal as the aircraft flies higher. This effect is stronger than the earth curvature alone, because the range to visual tangency with the earth surface is moving outward with increasing altitude. The range to the point of tangency, R2h, is approximately $(2*Rp*h)^{1/2}$, where h is the altitude above the ground, or above an underlying cloud layer that establishes a cloud horizon. The slope from the horizontal to the visual horizon is approximately $-2*h/R2h$. Note that this slope is always negative. For a specific example, note that a pilot flying at 40,000 feet sees a visual horizon at a range of about 200 nm, depressed about 3.5 degrees down from the horizontal. This is nearly 50 video scan lines.

Earth curvature depression is implemented in the geometry processing stage of the rendering pipeline. When it is active, the system must also compute a separate altitude for each vertex, to drive the layered fog process. Recall that layered fog operates in a flat-earth coordinate system, where the layers extend indefinitely in all directions at constant heights from the Cartesian datum plane, which is typically at z=0. Proper fogging of scene details requires them to be processed in this same flat-earth coordinate system. However, since only the z values differ between this and the curved earth system, only the additional altitude value is needed. This value is interpolated to obtain the altitude where each pixel ray intercepts the surface.

Figure 9A:
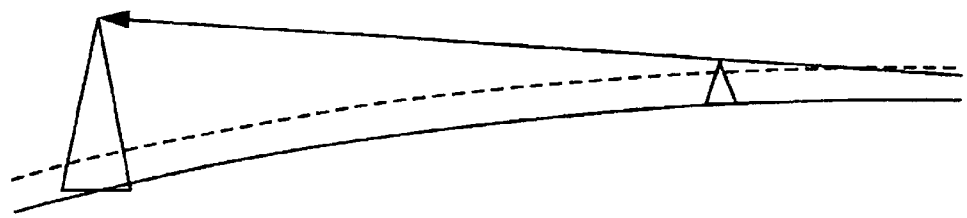
FIG. 9A graphically illustrates a problem with the state of the art in the simultaneous use of two different coordinate systems, where two mountain peaks, one near and one distant, lie along the same line of sight, as displayed in their curved earth positions.

A discrepancy arises in the simultaneous use of these two different coordinate systems, and it has unacceptable visual consequences. FIG. 9A illustrates the problem.

Figure 9B:
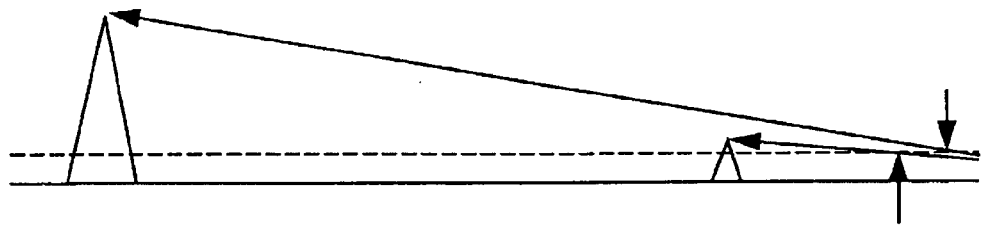
FIG. 9B graphically illustrates the scenario of FIG. 9A but in a flat earth model.

Two mountain peaks, one near and one distant, lie along the same line of sight, as displayed in their curved earth positions. The distant peak is higher, but has been depressed farther due to its greater distance from the observer. Visually, their juxtaposition in the image plane properly simulates the effect of a curved earth, as FIG. 9A shows. Both peaks are obscured by a textured cloud layer, which is processed in a flat-earth coordinate system, as FIG. 9B shows. Here, a pixel just grazing past the near peak and hitting the distant peak actually pierces the texture layer at a very different place than the pixel that hits the near peak. The two pixels get textured differently, and the visual effect is a discontinuity in the texture motif that outlines the near peak against the distant peak, even though both are totally obscured.

Figure 10A:
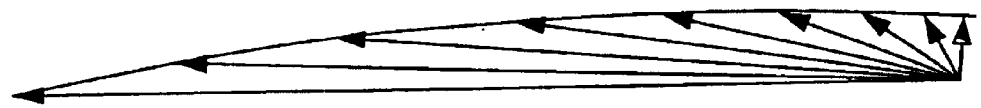
FIG. 10A graphically illustrates how in the real world, cloud layers follow the curvature of the earth, resulting in a cloud ceiling that will curve down toward and eventually touch (and pass below) the horizon.

FIG. 10A illustrates a related visual problem. In the real world, cloud layers follow the curvature of the earth, hence a cloud ceiling will curve down toward and eventually touch (and pass below) the horizon, as shown in FIG. 10A. Depending on the height of the overcast above the observer, the cloud texture may never get very edge-on, and appreciable textural detail will continue all the way to the horizon.

Figure 10B:
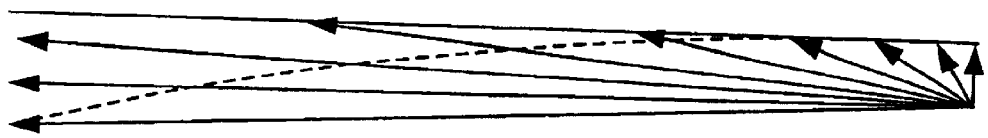
FIG. 10B graphically illustrates how in a flat-earth layer processing space, a cloud ceiling never reaches the horizon, and in fact becomes so oblique that all textural details must be suppressed somewhat above the horizon.

In our flat-earth layer processing space, however, a cloud ceiling never reaches the horizon, and in fact becomes so oblique that all textural details must be suppressed somewhat above the horizon, as shown in FIG. 10B. When this is combined with earth-curvature depression of distant terrain details, a fairly wide band of untextured cloud ceiling is presented at the horizon.

Both of these visual defects can be fixed by employing a non-linear transformation in the texture scanning process. This transform is tied to the geometric characteristics of the nearest cloud deck and ceiling layers. To understand the nature of this transform, first consider the flat-earth texture scanning process.

Figure 11:
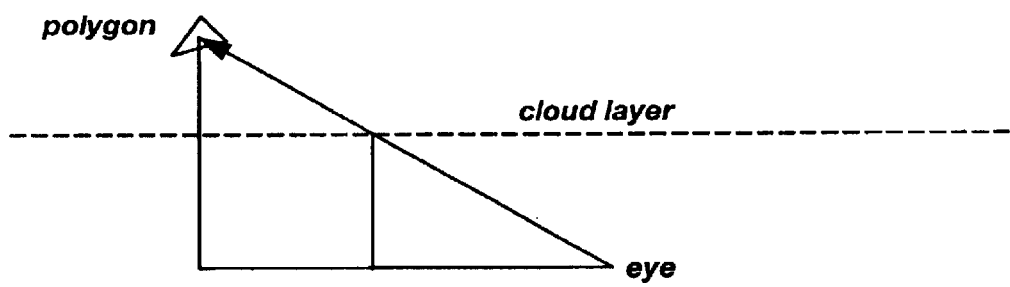
FIG. 11 graphically illustrates that when a cloud layer lies between the eye point and the polygon, the position where the view ray intersects the layer is computed by similar triangles.

View rays are projected from the eye point through each display pixel onto each scene polygon. These eye-to-pixel vectors are expressed in the "world" coordinate system as defined above. Actually, x and y do not need to be aligned with the west and north compass directions; however, z must be perpendicular to the cloud layers. As the eye point moves throughout the simulated environment, the position of the eye relative to the texture motif of each cloud layer is computed and saved. This value, an address into the texture map, has two coordinates, u and v, which are typically synonymous with the x and y world directions, although the scale is in "cloud units" rather than "feet", for example. When a cloud layer lies between the eye point and the polygon, the position where the view ray intersects the layer is computed by similar triangles, as shown in FIG. 11. This intersection is relative to the eye position, in texel units, and is added to the eye u and v coordinates to develop the final texel address.

The texel value is then used to shade the cloud color. The eye-to-pixel vector is normalized to unit length for ease of use. The z component is reciprocated to create a "range ratio". The range ratio is "1" straight overhead, and increases towards the horizon, where it finally goes to infinity. This value is multiplied by the height delta from the eye to the cloud layer, then by the x and y parts of the unit normal to compute the u and v texture address offsets. There are several points in this process where the scale difference between "feet" and "cloud units" can be applied. Note that the range ratio is also used, in conjunction with the eye-to-layer range, to compute the texture level-of-detail. One important result of using this formulation is that things which are coincident on the display are textured consistently, eliminating the texture discontinuity problem discussed above.

Now consider the scanning of a curved cloud ceiling, compared to the flat-earth version. Overhead, and for quite some distance out towards the horizon, the flat and curved ceilings follow quite closely. Near the horizon, however, they diverge dramatically. The view ray continues to intersect the curved ceiling in a well-contained manner, but the range to intersection with the flat ceiling goes to infinity at the horizontal, and is undefined for view rays below the horizontal. The "range ratio" derived above no longer properly defines texture behavior. For the curved ceiling, it should increase to a limiting and fairly modest value, whereas for the flat ceiling, it quickly goes to infinity.

It is desired to scan the cloud texture motif as if it were following the curve of the earth. One way to do this is to compute the intersection of each view ray with the curved cloud layer. This can be done with some fairly heavy arithmetic; however, it is only necessary to understand how the range to intersection changes; i.e. a new "range ratio" is needed. To accomplish this, a transformation on the z component of the eye-to-pixel unit normal is implemented, prior to reciprocating it. In effect, this transformation tips each eye-to-pixel vector just enough to cause it to intersect the flat cloud layer at the same range as it would have intersected the curved layer.

The transform that converts z to a range ratio does most of its work near the horizon. Its primary effect is to prevent the range ratio from growing without bound. We can modify this transform as a function of the eye to ceiling height delta to provide a more accurate portrayal of texture behavior on a curved ceiling. Note that if we are close to the cloud ceiling, even portions near the horizon are quite close, and the curvature is still near zero. As we get farther below the ceiling, we see more of the curved portion of the ceiling. As the aircraft moves between cloud layers, this transform is changed continually and gradually. However, when we climb or descend through a cloud layer, we must make a sudden substitution of an entirely new transform corresponding to the new ceiling value. We can do this substitution while we are inside the layer, provided we require every layer to be "thick" enough visually to obscure things near the horizon, and provided we constrain the transform to operate primarily near the horizon.

Note that a different transform can be used to "curve" the texture on the cloud deck below the eye. It will be driven by the eye-to-deck height delta, and will operate primarily to increase the range ratio close to the horizon. Both of these transforms will operate on the z component of the eye-to-pixel vector to generate a new z value that is then reciprocated to get the range ratio.

For efficiency, we pick a form for the transform that can be used to do either ceilings or decks, since any particular eye-to-pixel vector can only hit one or the other. For cloud ceilings, i.e. "looking up", $$z'=\max(z,0)+fadein*\max(0,t1up-t2up*abs(z))^2 \quad \text{Equation 18}$$

This transformation has the effect of always pushing the vector up, away from the horizon and toward the cloud ceiling. Note that z' is always positive; i.e. its always headed toward the cloud ceiling, as it should. The fadein value is used to ensure that the z' differs from z only near the horizon, and is simply a function that goes from 0 somewhere above the horizon, to 1 a little bit nearer. The absolute value operators are needed because z can be negative for pixels that are above the eyepoint, but have been depressed appreciably. The coefficients are:

$$t1up=0.824*(e2c/Rp)1/4 \quad \text{Equation 19}$$

$$t2up=0.223*t1up/(e2c/Rp)^{1/2} \quad \text{Equation 20}$$

where e2c is the positive eye-to-ceiling height difference, and Rp is the radius of the planet; both must be in the same units. These coefficients only need to be computed at the eyepoint rate (i.e. once per frame), and are done in general purpose hardware.

For cloud decks, i.e. "looking down", the transform is:

$$z'=z+\max(0, t1dn-t2dn*abs(z))^2 \quad \text{Equation 21}$$

Note that since z is negative when an observer is looking down, and we are always adding a positive offset to it, we are pushing z' towards 0 near the horizon, which increases the range ratio as required. No fadein ramp is needed with this equation. The coefficients are:

$$t1dn=2.72*(e2d/Rp)^{1/3} \quad \text{Equation 22}$$

$$t2dn=3 \quad \text{Equation 23}$$

where e2d is the positive eye-to-deck height difference.

These transforms are approximations to the ray/ceiling intersection arithmetic, and were developed for efficient inclusion in hardware. Other transforms could also be used.

Note that these transforms are characterized by the relationship of the eye altitude and the enclosing cloud deck and ceiling altitudes, but are applied to all cloud/fog obscuration computations for the frame. Because they change things only near the horizon, global differences in fogging are masked during the transit of a layer by the eyepoint.

Accordingly, another of the novel aspect is that the present invention applies a transform to the length of a texture scanning vector that causes a horizontal plane to appear to follow the curvature of the earth. The system provides separate transforms for horizontal planes that are above and below the eyepoint, to simulate the appearance of cloud decks and ceilings. The transform also modifies the computation of texture level-of-detail so it correlates with the curved visual result. Further, the nature of the transform is easily changed to account for the relative proximity (in altitude) of the eye to the deck and ceiling planes.

The present invention also incorporates a sort of "poormans" supertexture. This function addresses the problem of premature loss of cloud texture detail in the distance, where the cloud layer is increasingly oblique to the view ray.

Texture that is applied to scene polygons is typically managed to present the most detailed scene that can be handled without objectionable aliasing. Typically, this means using the highest resolution level-of-detail where texels are still larger than pixels. Level-of-detail determination consists of measuring the long dimension of the pixel footprint projected onto the polygon. As this dimension increases, the system blends to progressively coarser (i.e. physically larger) texels, to ensure that adjacent pixels in the image do not skip over adjacent texels on the surface. The length of the projected pixel footprint is proportional to the angular subtense of the pixel, the range from the eye to the surface, and the stretch factor caused by surface "tilt" with respect to the eye. The stretch factor is the range to the pixel divided by the perpendicular range to the polygon. In brief, the projected pixel footprint=$s*r^2/h$, where s is the pixel subtense in radians, r is the range, and h is the "height" of the eye above the plane of the polygon. The footprint length is scaled into texels to choose the appropriate level of detail.

There is a peculiar problem with this process.

Texels are typically square within each texture level-of-detail. When a surface is appreciably oblique to the viewer, texels which are squished to about a pixel wide in their compressed direction are still many pixels wide in the other direction. As viewed in the computed image, the texture motif is sharp in the direction of the pixel footprint, and progressively very blurry at right angles to this direction. The visual appearance is that the texture detail abruptly vanishes on steeply oblique surfaces, and that texture detail is not consistent and uniform throughout the scene. A general solution to this problem has previously been patented in U.S. Pat. No. 5,651,104 issued to Cosman and entitled Computer Graphics System and Process for Adaptive Supersampling.

Layered cloud texture is somewhat different. In general, cloud layers are not visually "busy", nor are they particularly "specific." It is neither desirable nor economic to provide and process large, complex cloud texture motifs. Very realistic scenes can be created with small generic texture motifs, and with texture level-of-detail transitions that occur well before cloud texels become pixel-limited. In fact, by forcing texture LOD to happen when cloud texels are still quite large, the associated processing hardware can be substantially reduced. This strategy also allows a modified level-of-detail transition process that provides more uniform texture detail, and avoids the sudden disappearance of textural detail in the distance.

First, we will use the range ratio that comes from the z' value. This matches the texture level of detail to the curved layer geometry, rather than the flat-earth case, and allows textural detail to follow the cloud ceiling all the way to the horizon, as it does in the real world. Note that the range ratio continues to increase towards the horizon, but the "obliqueness" of the cloud ceiling reaches a limiting value, which is approximately 2/t1up. For texture LOD determination, we will limit the range ratio to this value. Next, we will separate the range and slant parts of the pixel footprint processing and treat them differently:

| | | |
|---|---|---|
| s | = | pixel subtense in radians |
| A | = | range ratio or aspect ratio limit, |
| | | = R/h, nominally, or 1/z, limited to 2/t1up |
| R | = | range to cloud texture plane in database units, |
| | | = (range ratio) * (eye to texture height delta) |
| t | = | texel size in radians where LOD transitions, |
| | | should be much larger than s. . . |
| T | = | texel size in database units |
| M | = | required texture level-of-detail, |
| | | 1 = highest, 2 = next, etc. |

First, the standard formulation:

$$pps = s^* R^2 / h = s^* R^* A \quad \text{Equation 24}$$

$$M = pps/T = R/T^* s^* A \quad \text{Equation 25}$$

Now the supertexture twist:

$$M = t^* R/T^* A^* s/t \quad \text{Equation 26}$$

(multiply, then divide by t)

$$M = t^* R/T^* \max(1, (A^* s/t)) \quad \text{Equation 27}$$

At this point some comments are in order. First, note that R/T is the reciprocal of the instantaneous texel subtense in radians. If we are looking straight up or down, A=1, and M is entirely determined by the first half of the equation. In this case, t*R/T produces a dimensionless value where 1 indicates that texels now appear the size they are when the LOD transition should begin, and values greater than 1 take us through the lower LOD's. Now consider what happens when the first term is just at the threshold of forcing the first LOD transition (=1). In this case, the long dimension of a texel just subtends t radians; remember that it is still much larger than a pixel. The ratio s/t is always less than 1, so the value of A can become much larger than 1 before this term starts affecting the displayed LOD. This term allows texels to become oblique to where the compressed dimension of the texel is pixel size (s rather than t) before forcing an LOD transition. The max operator on the second half of the equation is necessary to keep the range and slant parts of the function properly separated. The overall effect of the equation is to ensure that the selected texel size is larger than t in its uncompressed direction, and larger than s in its compressed direction.

Accordingly, another point of novelty of the present invention is that it computes texture level of detail by separating the range and slant parts of the process, and applying separate limits to each portion. The process allows texture LOD to be based on a combination of the perspective size of the texel in either its visually compressed or uncompressed directions, and hence provides better homogeneity of textural detail for oblique surfaces.

Figure 12:
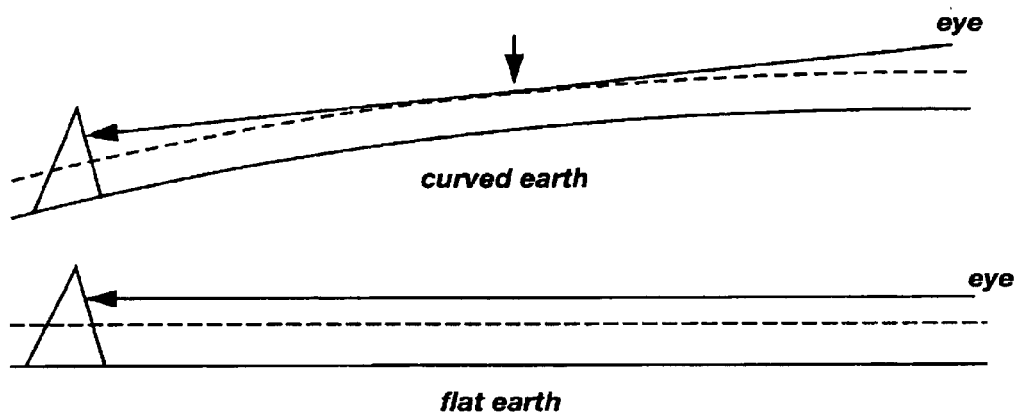
FIG. 12 graphically illustrates the concept of cloud clipping.
Figure 13:
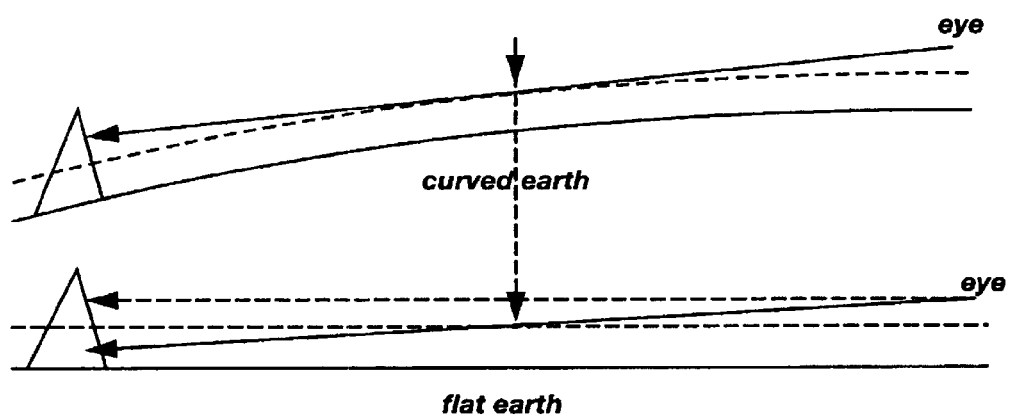
FIG. 13 is additional graphical illustration of the concept shown in FIG. 12.

Another important issue is that of a cloud layer "Horizon Clip." Cloud layer decks present another problem. The curved layer establishes a nominal horizon line whose angle below the horizontal, and range to point of tangency, are defined by the height of the eye above the layer. Scene details above the layer but farther than the horizon range and below the angle of tangency should be occulted by the layer. The boundary where this occlusion takes place needs to be antialiased so the "clip" line doesn't crawl. FIGS. 12 and 13 illustrate the strategy chosen; the discussion assumes the scene detail is above the cloud layer and beyond the horizon range.

First, note that a view ray whose slope (z component of the eye-to-pixel unit normal) is just higher than the horizon slope should not be affected by the layer (FIG. 12). Second, a view ray just below the horizon slope should be fogged as if it were totally occluded by the layer. In this case, the color of the scene detail should be replaced by the color of the layer at the horizon, which is conveniently where all textural detail has been mipped out. Since the horizon color is constant right at the horizon line, we establish a one-pixel wide region at the horizon where we perform a linear blend between the polygon color and the constant horizon color. This effectively antialiases the clip boundary.

Below this blend region, we must "sink" the scene detail below the layer to ensure that it gets occulted. We do this by further depressing its altitude, but not changing the associated range ratio, which must remain tied to the z' value to ensure texture motif consistency, as shown in FIG. 13. Note that for a view ray just at the horizon, we want depress it an amount that makes it intersect the cloud deck at the horizon range. As view rays descend farther below the horizon, we relax the depression function so that the effect stays focused near the horizon, and scene details appreciably below the horizon are not modified. Note that there is a small slope-delta limit to the amount that a scene detail can be above the layer but below the horizon slope-typically about 0.125, or about 7 degrees, based on maximum visibility ranges of several hundred miles and maximum flight altitudes of about 60,000 feet.

A polygon that exists both above and below the layer altitude, and both in front of and behind the horizon range, will show a sharp discontinuity at the horizon range where the horizon occultation process kicks in. We prevent this by ramping the horizon blend in gradually, beginning somewhat closer than the horizon range. Finally, if the eye is just barely descending into the deck layer, but the pixel is above the horizon, we need to modify the view ray to account for the fact that it is grazing the top of the layer. We do this by forcing a short portion of it, beginning at the eye, to be horizontal so that a little bit more of the layer top gets applied to the pixel.

Accordingly, another novel of the present invention is that it provides the visual effect of a cloud deck on a curved earth properly occulting scene details that lie above the altitude of the cloud layer, but beyond the cloud horizon range, and below the eye-to-horizon slope. The system uses a pixel-level blend to antialias the nominal horizon, and depresses the altitude of scene details that should be occulted, on a pixel by pixel basis, to hide them beneath the cloud deck. It further applies a blend into this effect based on the relative range of scene details and the cloud horizon, to prevent visual anomalies for scene details at the horizon range.

Figure 14:
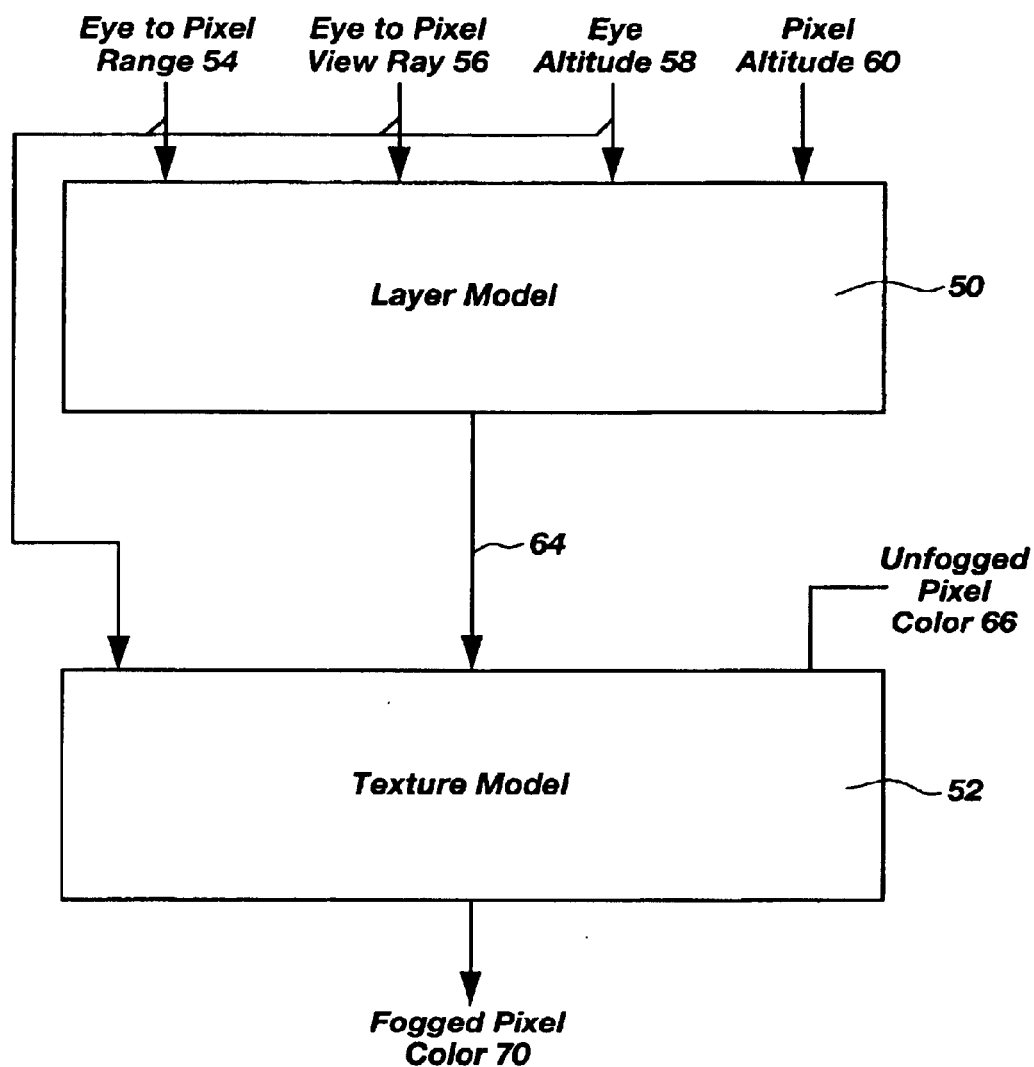
FIG. 14 is a block diagram of layered fog hardware as implemented in a presently preferred embodiment in accordance with the principles of the present invention.

FIG. 14 is provided as a preferred embodiment of a layered fog hardware block implementation. A layered fog means is provided pixel information from the rasterization of polygons and the pixel-rate illumination which is per-formed in each of the pixels produced by the rasterization. The altitude of a pixel is a result of interpolating the altitudes from the vertices of each polygon that is rasterized. For each pixel that is generated for a polygon, an illumination algorithm is applied (such as phong shading) and the pixel range and the eye-to-pixel viewray are products of this illumination algorithm.

FIG. 14 shows two main elements of the layered fog hardware. These elements are the layer model 50 and the texture model 52. Both the layer model 50 and the texture model 52 receive as inputs the eye to pixel range 54, the eye to pixel viewray 56, and the eye altitude 58. However, the layer model 50 also receives the pixel altitude 60 as input.

The texture model 52 receives as input the output 64 of the layer model 50, and the unfogged pixel color 66. The output of the texture model 52 is the fogged pixel color 70.

Figure 15:
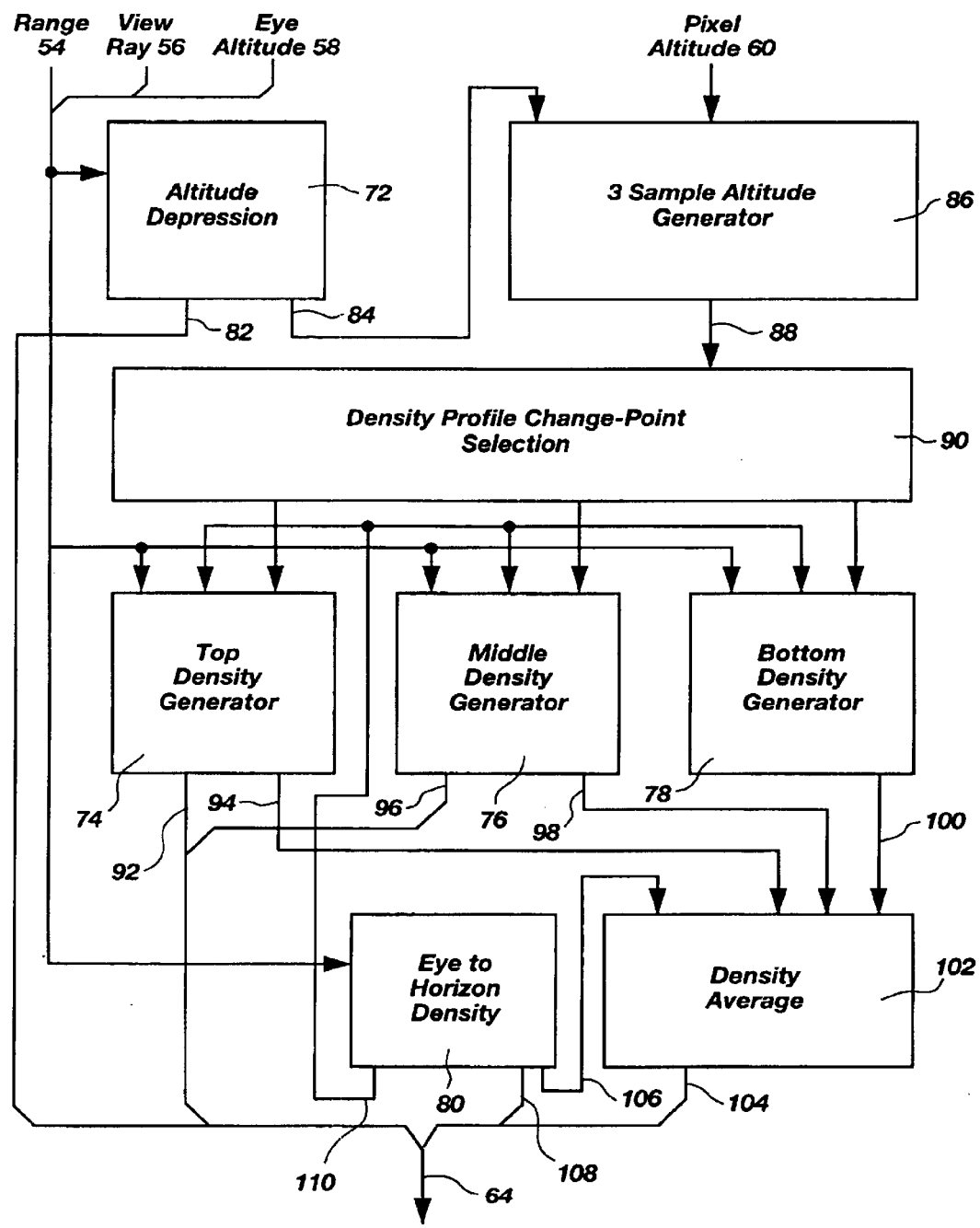
FIG. 15 is an expanded block diagram of the components of the layer model element of the layered fog hardware of FIG. 14.

FIG. 15 is a block diagram showing a break down of the functional components within the layer model 50. The functional components which receive as inputs all of the inputs 54, 56, 58 common to the layer model 50 and the texture model 52 include an altitude depression module 72, a top density generator 74, a middle density generator 76, a bottom density generator 78, and an eye to horizon density module 80.

The altitude depression model 72 has two outputs. A first output 82 is coupled to the output 64 of the layer module 50. A second output 84 functions as an input to a three sample altitude generator 86. An output 88 of the three sample altitude generator 86 is the only input to a density profile change-point selection module 90. This module in turn provides input to the top density generator module 74, the middle gensity generator 76, and the bottom density generator 78.

A first output 92 of the top density generator 74 is an input to the layer model output 64. A second output 94 is an input to a density average module 102. The middle density generator 76 also has a first output 96 which is coupled to the layer model output 64, and a second output 98 which is an input to the density average module 102.

The bottom density generator has only a single output 100 which is coupled to the density average module 102. The density average module receives an input 106 from the eye to horizon density model 80, and has an output signal 104 which is also coupled to the layer model output 64.

Finally, the eye to horizon density module 80 has a second output 108 which is coupled to the layer model output 64, and a third output 110 which is an input signal to the top density generator 74, the middle density generator 76, and the bottom density generator 78.

As a brief description of the modules, the altitude depression module determines the relationship of the pixel position, eye position, and the horizon. From this information a depressed altitude and blend factor are generated for use by other modules in the system.

The three sample generator 86 creates three anti-aliasing sample altitudes near the pixel altitude based on the viewray and the polygon orientation.

The density profile change-point selection module 90 compares each of the anti-aliasing samples against the density profile, and the appropriate change-point is selected for use in the density generators.

The top, middle and bottom density generators 74, 76 and 78 determine the vertical density between the eye altitude and the sample altitude, then based on the range and viewray, the density between the eye and pixel position is determined.

The eye to horizon density block determines the interaction of the viewray and horizon, and calculates a density offset which is used by the density averaging module 102 and the texture model 52.

The density average module 102 blends the three sample densities into a final pixel density value.

Figure 16:
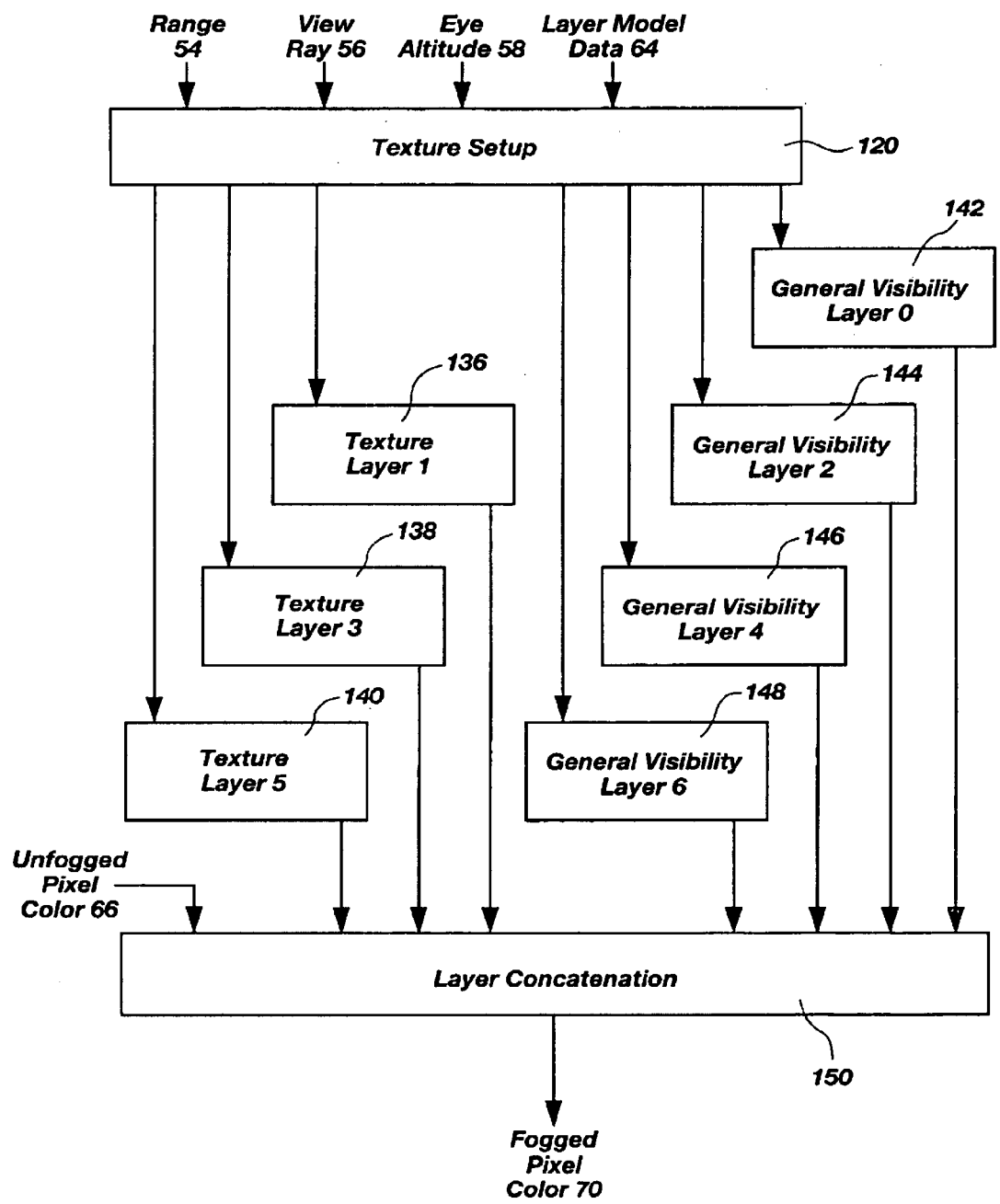
FIG. 16 is an expanded block diagram of the components of the texture model element of the layered fog hardware of FIG. 14.

FIG. 16 is a block diagram showing a break down of the functional components within the texture model 52. The functional component which receives as inputs all of the inputs 54, 56, 58 common to the layer model 50 and the texture model 52 is a texture setup module 120. This module 120 also receives as input the layer model output 64.

The texture setup module 120 sends out seven output signals, one signal for each of the texture layer modules 136, 138 and 140, and one signal for each of the general visibility modules 142, 144, 146 and 148. Each texture layer module and general visibility module also has a single output signal which is transmitted to a layer concatenation module 150. The layer concatenation module also receives as input the unfogged pixel color signal 66, and generates the fogged pixel color output signal 70. The texture setup module 120 calculates common data required by the general visibility and etxture layers and initiates the evaluation of the seven defined layers for a pixel.

The general visibility layers determine the amount of fog density on the portion of the viewray that intersects through these low density fog regions.

The texture layers apply the texture data to the color and density of the fog to that portion of the view ray that intersects through these high-density fog regions.

Finally, the layer concatenation module 150 collects the results of the general visibility and the texture layers and concatenates the results into a final fog transmittance and fog color. The transmittance value is used to blend between the final fog color and the unfogged pixel color.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for providing a multilayer visual cloud effect in a computer-generated synthetic environment, said method comprising the steps of:
   applying a texture motif to a cloud layer, wherein the texture motif is associated with each of two horizontal texture planes disposed inside the cloud layer;
   determining an eyepoint distance from the cloud layer to be used for modifying the texture motif and selecting a texture plane;
   utilizing the texture motif to modify a brightness and a visual density of the cloud layer;
   selecting an upper texture plane when an eye position is above the upper texture plane, and selecting a lower texture plane when the eye position is below the lower texture plane; and
   concatenating a plurality of the cloud layers to account for curvature of the earth.

2. The method as defined in claim 1 wherein the method further comprises the step of attenuating a texture effect when the eye position moves from outside the cloud layer toward the upper texture plane or the lower texture plane, such that when the eye position is at a same altitude as one of the texture planes, the texture motif of that texture plane is not visible.

3. The method as defined in claim 2 wherein the method further comprises the step of applying to the computer-generated synthetic environment the texture motif at a lateral position relative to the eye position as an instantaneous layer fog color and density delta.

4. The method as defined in claim 3 wherein the method further comprises the step of generating a visual effect of scudding when moving the eye position inside the cloud layer, wherein the eye position is able to fly through the cloud layer and avoid a sudden penetration of a texture plane.

5. The method as defined in claim 4 wherein the method further comprises the step of utilizing an altitude based blend region to thereby transition from a distant to a local texture effect as the eye position approaches the texture plane of the cloud layer, to thereby mask penetration of the texture plane, and wherein the scudding effect is spatially and % temporally correlated.

6. The method as defined in claim 5 wherein the method further comprises the step of providing visual attributes to the cloud layer, wherein these visual attributes include color, texel size, texel stretch, texel level of detail control, brightness modulation amplitude, visual density modulation amplitude and an illumination direction flag.

7. The method as defined in claim 6 wherein the method further comprises the step of assigning independent intensity modulation gains to a top texture layer and to a bottom texture layer, wherein the intensity modulation gain is applied to the texture to thereby scale texture values.

8. The method as defined in claim 7 wherein the method further comprises the step of applying a visual density modulation gain factor to the texture layer, wherein the visual density modulation gain factor modifies a visual thickness of fog in the cloud layer.

9. The method as defined in claim 8 wherein the method further comprises the step of utilizing texture to modify a visual density of the cloud layer, wherein a density variation is constrained by an available cloud layer density to thereby prevent visual anomalies.

10. The method as defined in claim 9 wherein the method further comprises the step of moving light and dark portions of the texture motif based on a prior look-up of that texture motif to thereby enhance a three dimensional appearance of the texture motif.

11. The method as defined in claim 10 wherein the method further comprises the step of reversing perception of movement of the light and the dark portions of the texture motif by modifying a direction of illumination that reaches the cloud layer.

12. The method as defined in claim 11 wherein the method further comprises the step of concatenating the plurality of the cloud layers in an order determined by relative altitudes of the pixel to eye vector and a view ray intercept.

13. The method as defined in claim 12 wherein the method further comprises the step of including an additional concatenation stage to thereby apply a horizon blend, wherein the concatenation is based on combining an incoming and a stage color based on stage opacity.

14. The method as defined in claim 13 wherein the method further comprises the step of utilizing a non-linear transformation in a texture scanning process to thereby account for curvature of a horizon.

15. The method as defined in claim 14 wherein the method further comprises the step of applying the non-linear transform to a length of a texture scanning vector that causes a horizontal plane to appear to follow a curvature of the horizon.

16. The method as defined in claim 15 wherein the method further comprises the step of providing separate non-linear transforms for horizontal planes that are above and below the eye position, to thereby simulate an appearance of cloud decks and cloud ceilings.

17. The method as defined in claim 16 wherein the method further comprises the step of applying non-linear transforms that modify a computation of texture level of detail so that it correlates with a curved visual result.

18. The method as defined in claim 17 wherein the method further comprises the step of modifying the non-linear transform to thereby account for a relative proximity, in altitude, of the eye position to the cloud decks and the cloud ceilings.

19. The method as defined in claim 18 wherein the method further comprises the steps of:
    (1) determining the texture level of detail by separating a range determination process and a slant factor determination process; and
    (2) applying separate limits to the range determination process and to the slant factor determination process.

20. The method as defined in claim 19 wherein the method further comprises the step of determining the texture level of detail as determined by a combination of a perspective size of a texel in either a visually compressed or uncompressed directions, to thereby provide better homogeneity of textural detail for oblique surfaces.

21. The method as defined in claim 20 wherein the method further comprises the step of generating a visual effect of the cloud deck on a curved horizon that correctly occults scene detail that lie above the altitude of the cloud layer, but which lie beyond a cloud horizon range, and below an eye to horizon slope.

22. The method as defined in claim 21 wherein the method further comprises the step of utilizing a pixel level blend process to antialias a nominal horizon, and which depresses an altitude of scene detail that should be occulted, on a pixel by pixel basis, to thereby hide the scene details beneath the cloud deck.

23. The method as defined in claim 22 wherein the method further comprises the step of applying a blending effect based on a relative range of scene details and the cloud horizon, to thereby prevent visual anomalies for the scene details at the cloud horizon range.

24. A method for providing a multilayer visual cloud effect in a computer-generated synthetic environment, said method comprising the steps of:
    applying a texture motif to a cloud layer, wherein the texture motif is associated with each of two horizontal texture planes disposed inside the cloud layer;
    determining an eyepoint distance from the cloud layer to be used for modifying the texture motif and selecting a texture plane;
    utilizing the texture motif to modify a brightness and a visual density of the cloud layer;
    selecting an upper texture plane when an eye position is above the upper texture plane, and selecting a lower texture plane when the eye position is below the lower texture plane;
    concatenating a plurality of the cloud layers to account for curvature of the earth; and
    concatenating the plurality of the cloud layers in an order determined by relative altitudes of the pixel to eye vector and a view ray intercept.

* * * * *